United States Patent
Kato et al.

(10) Patent No.: US 7,852,029 B2
(45) Date of Patent: Dec. 14, 2010

(54) CONTROL DEVICE AND CONTROL METHOD OF BOOST CONVERTER

(75) Inventors: Takayuki Kato, Saitama (JP); Hajime Kondoh, Tokyo (JP); Keiichi Minamiura, Toyota (JP)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 12/203,380

(22) Filed: Sep. 3, 2008

(65) Prior Publication Data
US 2009/0058337 A1 Mar. 5, 2009

(30) Foreign Application Priority Data
Sep. 5, 2007 (JP) .............................. 2007-230260

(51) Int. Cl.
*H02P 6/08* (2006.01)
*B60L 11/18* (2006.01)
*G05F 1/00* (2006.01)

(52) U.S. Cl. .............. 318/434; 318/400.01; 318/400.34

(58) Field of Classification Search ................. 318/689, 318/432–434, 400.01, 400.15, 400.22, 400.34, 318/650, 801, 459; 323/222; 180/443, 446, 180/65.275, 65.285; 363/21.12, 21.17, 21.18, 363/59, 89, 97, 98; 701/41, 42
See application file for complete search history.

(56) References Cited

U.S. PATENT DOCUMENTS

| 6,377,015 B1* | 4/2002 | Nakabayashi et al. ....... 318/650 |
| 6,841,954 B2* | 1/2005 | Nakabayashi ................. 318/62 |
| 6,987,371 B2* | 1/2006 | Kifuku ........................ 318/432 |
| 7,158,332 B2* | 1/2007 | Kokami ........................ 360/75 |
| 7,583,069 B2* | 9/2009 | Suzuki ........................ 323/285 |
| 7,596,441 B2* | 9/2009 | Yokota et al. ................. 701/41 |
| 2004/0041530 A1* | 3/2004 | Peterson ...................... 318/254 |
| 2004/0232865 A1* | 11/2004 | Suzuki ........................ 318/439 |

(Continued)

FOREIGN PATENT DOCUMENTS

EP 1 561 670 A2 8/2005

(Continued)

OTHER PUBLICATIONS

Jiaxin Chen et al, "*Performance Analysis of a Surface Mounted Permanent Magnet Brushless DC Motor Using an Improved Phase Variable Model*", Industry Applications Conference, Sep. 1, 2007, pp. 2169-2174.

*Primary Examiner*—Walter Benson
*Assistant Examiner*—Eduardo Colon
(74) *Attorney, Agent, or Firm*—Arent Fox LLP (57) ABSTRACT

A control device of a boost converter which includes: an inverter circuit which controls switching to apply current to a stator winding of respective phases of a multi-phase brushless DC motor; and a boost circuit which is provided on an input side of the inverter circuit and has at least a reactor and a switching element, and controls ON and OFF states of the switching element of the boost circuit on the basis of a boost voltage command which is a command for boost voltage output from the boost circuit, the control device is provided with a boost voltage command setting unit which sets the boost voltage command on the basis of counter electromotive voltage of the brushless DC motor and a torque command for the brushless DC motor.

7 Claims, 8 Drawing Sheets

U.S. PATENT DOCUMENTS

| | | | |
|---|---|---|---|
| 2006/0117875 A1 | 6/2006 | Schneider et al. | |
| 2007/0043490 A1* | 2/2007 | Yokota et al. | 701/41 |
| 2007/0247123 A1* | 10/2007 | Bocchiola | 323/222 |
| 2008/0066995 A1* | 3/2008 | Yabuguchi et al. | 180/446 |
| 2009/0079373 A1* | 3/2009 | Nagase et al. | 318/400.22 |
| 2009/0128081 A1* | 5/2009 | Yoneda et al. | 318/689 |
| 2010/0012408 A1* | 1/2010 | Takasaki | 180/65.25 |

FOREIGN PATENT DOCUMENTS

| | | |
|---|---|---|
| JP | 6-38306 A | 2/1994 |
| JP | 06038306 A * | 2/1994 |
| JP | 08-214592 A | 8/1996 |
| JP | 2002-320397 A | 10/2002 |
| JP | 2003200838 A * | 7/2003 |
| JP | 2004-080998 A | 3/2004 |
| JP | 2005-210772 A | 8/2005 |
| JP | 2006-327301 A | 12/2006 |
| JP | 2007-068354 A | 3/2007 |

\* cited by examiner

CONTROL DEVICE AND CONTROL METHOD OF BOOST CONVERTER

BACKGROUND OF THE INVENTION

Priority is claimed on Japanese Patent Application No. 2007-230260, filed on Sep. 5, 2007, the contents of which are incorporated herein by reference.

FIELD OF THE INVENTION

The present invention relates to a control device and a control method of a boost converter.

DESCRIPTION OF THE RELATED ART

In the past, for example, there was known a control device in which a current command is calculated on the basis of a torque command for an electric motor and the rotation number of the electric motor, and a voltage command is calculated by a current feedback control process based on the current command and a current detection value or by a calculation process based on the current command and a predetermined voltage equation, and a boost voltage command used to boost battery voltage VB is set so as to ensure a motor terminal voltage or IPM input voltage (for example, DC voltage of an input side of an inverter) in response to the voltage command (For example, see Japanese Unexamined Patent Publication, First Publication No. 2004-80998).

However, in the known control device, since a boost control process which sets a boost voltage command and a current supply control process for the electric motor (that is, the current feedback control process or the calculation process based on the voltage equation) are not performed at independent timing one another, it is difficult to reduce processing load occurring upon performing a series of control processes. Moreover, it is difficult to perform the series of control processes at a high speed, because these processes are interfered one another.

The invention is made in view of above-mentioned circumstances and has an object of providing a control device of a boost converter and a control method of the boost converter which can reduce processing load of control processes including a current supply control process for a brushless DC motor and a boost control process of the boost converter and can perform the control processes at a high speed.

SUMMARY OF THE INVENTION

In order to solve the above problems and achieve the above-described object, the present invention employs the followings.

That is, according to a control device of a boost converter according to the present invention, there is provided an inverter circuit which controls switching to apply current to a stator winding of respective phases of a multi-phase brushless DC motor; and a boost circuit which is provided on an input side of the inverter circuit and has at least a reactor and a switching element, and controls ON and OFF states of the switching element of the boost circuit on the basis of a boost voltage command which is a command for boost voltage output from the boost circuit, the control device is provided with a boost voltage command setting unit which sets the boost voltage command on the basis of counter electromotive voltage of the brushless DC motor and a torque command for the brushless DC motor.

In the control device of the boost converter having the above-described configuration, since the boost voltage command is set on the basis of the counter electromotive voltage of the brushless DC motor and the toque command for the brushless DC motor, a boost control process can be performed at independent timing with a current supply control process for the brushless DC motor. Accordingly, it is possible to reduce processing load when performing these control processes, and perform the control processes at a high speed without mutual interference in the control processes.

Moreover, it is possible to set the appropriate boost voltage command even when the counter electromotive voltage varies with variation in the driving state of the brushless DC motor.

The control device of the boost converter according to the present invention, an angular speed detecting unit which detects an angular speed of the brushless DC motor; and a counter electromotive voltage calculating unit which sets, as the counter electromotive voltage, a value obtained by multiplying the angular speed detected by the angular speed detecting unit by a counter electromotive voltage constant of the brushless DC motor may be further provided.

In the control device of the boost converter having the above-described configuration, the boost voltage command can be set by setting as the counter electromotive voltage the value obtained by multiplying the angular speed of the brushless DC motor by the counter electromotive voltage constant, that is, by a feed forward control process. Accordingly, for example, since the boost control process can be performed at independent timing with the current supply control process including the current feedback control, it is possible to reduce the processing load and perform the control processes at a high speed.

The control device of the boost converter according to the present invention may further include a temperature detecting unit which detects a temperature of the brushless DC motor, wherein the counter electromotive voltage calculating unit sets the counter electromotive voltage constant so as to decrease with an increase in the temperature detected by the temperature detecting unit.

In the control device of the boost converter having the above-described configuration, since the counter electromotive voltage constant is set so as to decrease with the increase in the temperature of the brushless DC motor, it is possible to set the appropriate boost voltage command, even when the counter electromotive voltage is reduced with the increase in the temperature of the brushless DC motor.

The control device of the boost converter according to the present invention, wherein the brushless DC motor may include: a plurality of rotors capable of changing the relative phases one another; and a phase changing unit capable of changing the counter electromotive voltage with the change in the relative phases, wherein the control device of the boost converter further includes an angular speed detecting unit which detects an angular speed of the brushless DC motor; a counter electromotive voltage constant command calculating unit which calculates a counter electromotive voltage constant command, which is a command for the counter electromotive voltage constant, on the basis of the torque command for the brushless DC motor and the angular speed detected by the angular speed detecting unit; and a phase control unit which calculates a phase command instructing the phase changing unit to change the relative phases on the basis of the counter electromotive voltage constant command, and wherein the boost voltage command setting unit sets, as the counter electromotive voltage, a value obtained by multiplying the angular speed detected by the angular speed detecting unit by the counter electromotive voltage constant command, and sets the boost voltage command on the basis of the counter electromotive voltage and the toque command.

In the control device of the boost converter having the above-described configuration, in the brushless DC motor which allows the plurality of rotors capable of changing the mutual relative phase to change the magnitude of the magnetic field and the counter electromotive voltage constant, even when the counter electromotive voltage of the brushless DC motor varies in response to the counter electromotive voltage constant command which is the command for the counter electromotive voltage constant, it is possible to set the appropriate boost voltage command.

The control device of the boost converter according to the present invention may further include a field control unit which supplies weak field current when input voltage of the inverter circuit exceeds the boost voltage during a boost control process on the basis of the boost voltage command.

In the control device of the boost converter having the above-described configuration, it is possible to expand a running area from a running area attainable by the boost control process to a higher speed rotation side, by supplying the weak field current during the boost control process when the input voltage of the inverter circuit varying with an increase in the rotation number of the brushless DC motor, that is, an increase in the counter electromotive voltage, becomes higher than the boost voltage.

A control method of a boost converter according to the present invention may include: an inverter circuit which controls switching to apply current to a stator winding of respective phases of a multi-phase brushless DC motor; and a boost circuit which is provided on an input side of the inverter circuit and has at least a reactor and a switching element, and controls ON and OFF states of the switching element of the boost circuit on the basis of a boost voltage command which is a command for boost voltage output from the boost circuit, the control method comprising: setting the boost voltage command on the basis of counter electromotive voltage of the brushless DC motor and a torque command for the brushless DC motor.

In the control method of the boost converter having the above-described configuration, since the boost voltage command can be set on the basis of the counter electromotive voltage of the brushless DC motor and the toque command for the brushless DC motor, the boost control process can be performed at independent timing with the current supply control process for the brushless DC motor. Accordingly, it is possible to reduce the processing load when performing these control processes and perform the control processes at a high speed without mutual interference in the control processes.

The control method of the boost converter according to the present invention may further include supplying weak field current when voltage input by the inverter circuit exceeds the boost voltage during the boost control process on the basis of the boost voltage command.

In the control method of the boost converter having the above-described configuration, it is possible to expand the running area from the running area attainable by the boost control process to the higher speed rotation side, by supplying the weak field current during the boost control process when the input voltage of the inverter circuit varying with the increase in the rotation number of the brushless DC motor, that is, the increase in the counter electromotive voltage becomes higher than the boost voltage.

DETAILED DESCRIPTION OF THE INVENTION

Hereinafter, a control device and a control method of a boost converter according to an embodiment of the invention is explained with reference to the accompanying drawings.

Figure 1:
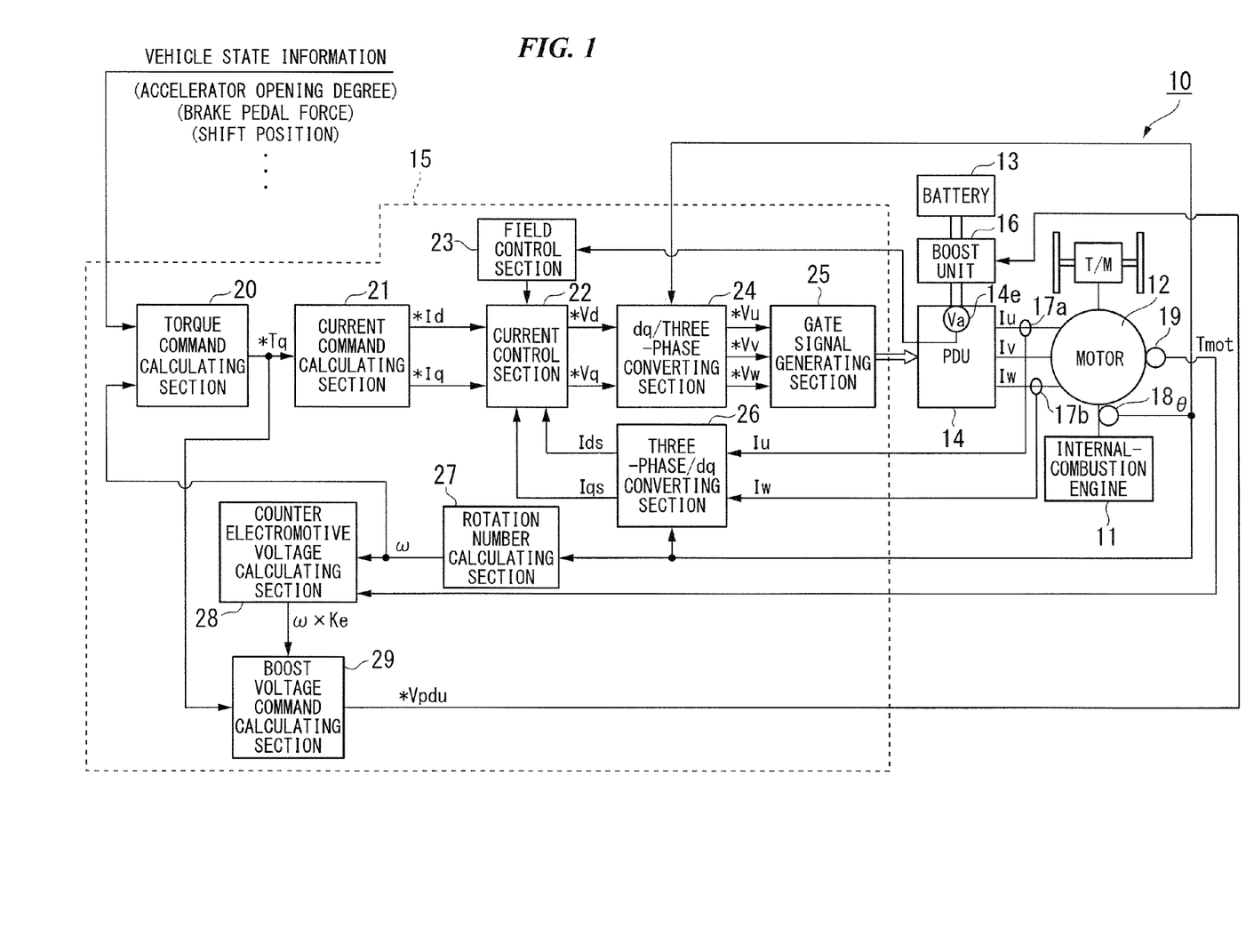
FIG. 1 is a schematic diagram illustrating a configuration of a control device of a boost converter according to an embodiment of the invention.

According to the embodiment, for example, the control device of the boost converter is provided in a motor control device 10 shown in FIG. 1. The motor control device 10, for example, controls driving of a brushless DC motor 12 (hereinafter, referred to as the motor 12) which is mounted as a driving source in a hybrid vehicle or the like along with an internal-combustion engine 11. The motor 12 is directly connected in series to the internal-combustion engine 11 and includes rotors (not shown) having permanent magnets used for a magnetic field and a stator (not shown) generating a rotating magnetic field rotating the rotors.

The motor control device 10 includes a power drive unit (PDU) 14 which uses a battery 13 as a DC power source, a control unit 15, and a boost unit 16. The control device of the boost converter includes, for example, the PDU 14, the control 15, and the boost unit 16.

In the motor control device 10, driving and regenerating operations of the multi-phase (for example, three phases of a U-phase, a V-phase, and a W-phase) motor 12 are performed by the power drive unit (PDU) 14 after receiving a control command output from the control unit 15.

Figure 2:
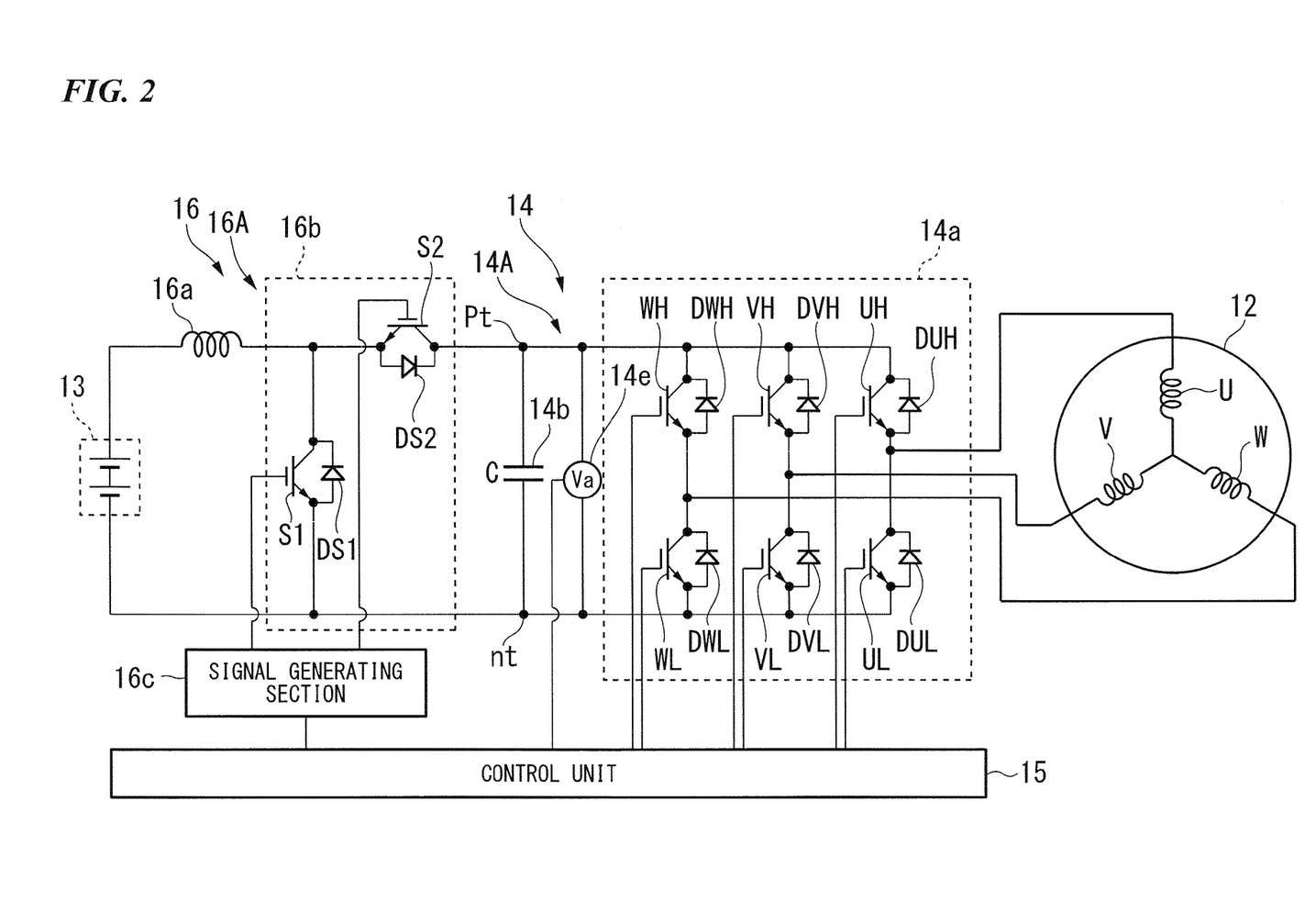
FIG. 2 is a diagram illustrating a configuration of the control device of the boost converter according to the embodiment of the invention.

As shown in FIG. 2, for example, the PDU 14 includes a PWM inverter 14A, which uses a pulse-width modulation (PWM) technique and has a bridge circuit 14a, which is formed by bridge connection of a plurality of transistor switching elements (for example, IGBT: Insulated Gate Bipolar Mode Transistor), and a smoothing capacitor 14b.

The high pressure battery 13 which gives and receives electric energy to and from the motor 12 is connected to the PDU 14 through the boost unit 16.

The boost unit 16 includes a boost circuit 16A, which is provided with a reactor 16a and a chopper circuit 16b constituted by two transistor switching elements (for example, IGBT: Insulated Gate Bipolar Mode Transistor), on an input side of the PWM inverter 14A. In addition, the PWM inverter 14A is connected to the battery 13 through the boost circuit 16A.

The PWM inverter 14A provided in the PDU 14 includes the smoothing capacitor 14b and the bridge circuit 14a, which is formed by the bridge connection of a pair of a high-side U-phase transistor UH and a low-side transistor UL, a pair of a high-side V-phase transistor VH and a low-side transistor VL, and a pair of a high-side W-phase transistor WH and a low-side W-phase transistor WL. The transistors UH, VH, and WH are connected to a positive terminal pt of the boost circuit 16A to constitute a high-side arm and the transistors UL, VL, and WL are connected to a negative terminal nt of the boost circuit 16A to constitute a low-side arm. The pair of the U-phase transistors UH and UL, the pair of the V-phase transistors VH and VL, and the pair of the W-phase transistors WH and WL are connected in serial to the boost circuit 16A. Diodes DUH, DUL, DVH, DVL, DWH, and DWL are connected between collectors and emitters of the transistors UH, UL, VH, VL, WH, and WL in a forward direction from the emitters to the collectors, respectively.

The boost circuit 16A is provided with the reactor 16a of which one end is connected to the battery 13 and to which battery voltage is applied; and the chopper circuit 16b which is constituted by a first transistor S1 and a second transistor S2, which are first and second switching elements, respectively, connected to the other end of the reactor 16a. Diodes DS1 and DS2 are connected between collectors and emitters of the transistors S1 and S2 in a forward direction from the emitters to the collectors, respectively.

The one end of the reactor 16a is connected to a positive terminal of the battery 13 and the other end of the reactor 16a is connected to the collector of the first transistor S1 and the emitter of the second transistor S2. The emitter of the first transistor S1 is connected to a negative terminal of the battery 13 and the negative terminal nt of the boost circuit 16A. The collector of the second transistor S2 is connected to the positive terminal pt of the boost circuit 16A.

The PDU 14 includes a voltage sensor 14e detecting inter-terminal voltage between the positive terminal pt and the negative terminal nt of the boost circuit 16A. The voltage sensor 14e is connected in parallel to the smoothing capacitor 14b of the PWM inverter 14A, which is connected between the positive terminal pt and the negative terminal nt. A detection signal output from the voltage sensor 14e is input to the control unit 15.

The boost unit 16 includes, for example, a signal generating section 16c which generates a pulse gate signal for ON/OFF driving of the switching elements of the boost circuit 16A at a duty ratio corresponding to a boost voltage command *Vpdu input from the a boost voltage command calculating section 29 which is described later, for example.

In the boost unit 16, when the first transistor S1 is set to be turned on (conduction) and the second transistor S2 is set to be turned off (cutoff) in accordance with the boost voltage command *Vpdu during a boost control process, for example, current flows to the positive terminal of the battery 13, the reactor 16a, the first transistor S1, and the negative terminal of the battery 13 in sequence, the reactor 16a is DC-energized, and then magnetic energy is accumulated.

Next, when the first transistor S1 is set to be turned off and the second transistor S2 is set to be turned on, electromotive voltage (induced voltage) is generated between both ends of the reactor 16a by disturbing variation in magnetic flux due to cutoff of the current flowing in the reactor 16a and the induced voltage by the magnetic energy accumulated in the reactor 16a is superimposed on the battery voltage, so that boost voltage higher than voltage between the terminals of the battery 13 is applied between the positive terminal pt and the negative terminal nt of the boost circuit 16A.

The boost unit 16 switches ON and OFF states of each of the transistors S1 and S2 at the duty ratio (that is, a ratio of the ON state to the OFF state of each of the transistors S1 and S2) corresponding to the boost voltage command *Vpdu. Variation in voltage due to this switching operation is smoothed by the smoothing capacitor 14b. The boost voltage corresponding to the boost voltage command *Vpdu is output between the positive terminal pt and the negative terminal nt.

Current is output to the positive terminal pt through the diode DS2 immediately before the second transistor S2 is set to the ON state by a gate signal corresponding to the boost voltage command *Vpdu.

The transistors S1 and S2 are not permitted to simultaneously set to the ON state. A period for which the first transistor S1 is turned ON is set to be shorter than a period for which the second transistor S2 is turned OFF. Appropriate dead time for which the transistors S1 and S2 become simultaneously turned OFF is set.

In the boost unit 16, during regeneration control, for example, the OFF state of the first transistor S1 is maintained while the ON state of the second transistor S2 is maintained.

The PDU 14, for example, sequentially commutates current supplied to stator windings (not shown) of the three-phase motor 12 by PWM (Pulse-Width Modulation), which is a sine-wave modulation technique changing DC power supplied from the battery 13 through the boost circuit 16A into three-phase AC power, by switching ON and OFF states of the pair of transistors UH and UL, the pair of the transistors VH and VL, and the pair of the transistors WH and WL in every phase in the PWM inverter 14A on the basis of a gate signal (for example, a PWM signal) which is a switching command input from the control unit 15 at the time of driving the motor 12. In addition, the PDU 14 supplies AC U-shape current Iu, V-phase current Iv, and W-phase current Iw to the stator windings of the phases.

In addition, the PDU 14, for example, drives ON and OFF of the switching elements of the PWM inverter 14A in accordance with pulses synchronized on the basis of the output waveform of a rotation angle θ of the respective rotors of the motor 12 in the control unit 15, changes the three-phase AC power output from the motor 12 into the DC power, and outputs a predetermined voltage value corresponding to the duty ratio of the pulses between the positive terminal pt and the negative terminal nt, when the battery 13 charges during the regeneration operation of the motor 12.

The control unit 15 performs a current feedback control process on d-q coordinates forming rotating rectangular coordinates and calculates an Id command *Id and an Iq command *Iq from a torque command *Tq set on the basis of, for example, an accelerator opening degree by an acceleration operation of a driver, a brake pedal force by a brake operation of a driver, and a shift position by a transmission operation of a driver. The control unit 15 calculates output voltages *Vu, *Vv, and *Vw of the respective phases on the basis of the Id command *Id and the Iq command *Iq, inputs the PWM signal as the gate signal to the PDU 14 in accordance with the output voltages *Vu, *Vv, and *Vw of the respective phases.

The control unit 15 controls a deviation between; d-axis current Ids and q-axis current Iqs which are obtained by changing detection values of the currents Iu, Iv, and Iw of the respective phase supplied from the PDU 14 to the motor 12 on the d-q coordinates, and the Id command *Id and the Iq command *Iq so as to be substantially zero.

The control unit 15 includes a torque command calculating section 20, a current command calculating section 21, a current control section 22, a field control section 23, a d-q/three-phase converting section 24, a gate signal generating section 25, a three-phase/d-q converting section 26, a rotation number calculating section 27, a counter electromotive voltage calculating section 28, and a boost voltage command calculating section 29.

Detection signals (for example, the U-phase current Iu and the W-phase current Iw) output from at least two phase current sensors 17a and 17b which detect the respective phase currents Iu, Iv, and Iw supplied to the stator windings of the respective phase of the motor 12, a detection signal output from the voltage sensor 14e which detects a boost voltage Va of the PDU 14, a detection signal output from a rotation sensor 18 which detects the rotation angle θ (that is, a rotation angle of a magnetic pole of the respective rotors with respect to a predetermined reference rotation position) of the respective rotors of the motor 12, and a detection signal output from a temperature sensor 19 which detects the temperature Tmot of the motor 12 is input to the control unit 15.

The torque command calculating section 20 calculates a rotation number command in accordance with vehicle state information which is constituted by the accelerator opening degree by the acceleration operation of a driver, the brake pedal force by the brake operation of a driver, and the shift position by a transmission operation of a driver. In addition, on the basis of a difference (rotation number difference) between the rotation number command and a motor rotation number ω output from the rotation number calculating section 27 described below, the torque command calculating section 20 acquires the torque command *Tq as a command value used to generate torque necessary for the rotation number difference or the like to be zero to the motor 12 by map searching for a predetermined map.

The current command calculating section 21 calculates a current command used to designate the respective phase currents Iu, Iv, and Iw supplied from the PDU 14 in the motor 12 on the basis of the toque command *Tq input from the toque command calculating section 20. The current command is output as the Id command *Id and the Iq command *Iq on the rotating rectangular coordinates to the current control section 22.

For example, the d-q coordinates forming the rotation rectangular coordinates is set on the assumption that a flux direction of a magnetic field pole by the permanent magnet of the rotor is a d-axis (magnetic field axis) and a direction perpendicular to the d-axis is a q-axis (torque axis) and rotates in synchronization with a rotation phase of the respective rotors of the motor 12. Accordingly, the Id command *Id and the Iq command *Iq, which are DC signals, are configured to be supplied as a DC command for an AC signal supplied from the PDU 14 to the respective phases of the motor 12.

The current control section 22 calculates a deviation ΔId between; an additional value (*Id+d-axis correction current) of the Id command *Id and the d-axis correction current input from the field control section 23, and the d-axis current Ids, and calculates a deviation ΔIq between the Iq command *Iq and a q-axis current Iqs. For example, the current control section 22 calculates a d-axis voltage command value *Vd by amplifying the deviation ΔId by a PI (Proportional Integral) operation in accordance with a motor rotation number ω output from the rotation number calculating section 27, and calculates a q-axis voltage command value *Vq by amplifying the deviation ΔIq.

The field control section 23 outputs to the current control section 22 a target value of weak field current as the d-axis correction current for a weak field control process, which controls a current phase so as to equivalently weaken a magnetic field degree of the respective rotors, in order to suppress an increase in the counter electromotive voltage accompanied with an increase in a motor rotation number ω of the motor 12, when input voltage of the PWM inverter 14A varying by the counter electromotive voltage of the motor 12 becomes higher than the boost voltage detected by the voltage sensor 14e during the boost control process in the PDU 14.

The d-q/three-phase converter section 24 uses the rotation angle θ of the respective rotors input from the rotation sensor 18 to convert the d-axis voltage command value *Vd and the q-axis voltage command value *Vq on the d-q coordinates into a U-phase output voltage *Vu, a V-phase output voltage *Vv, and a W-phase output voltage *Vw, which are voltage command values on three-phase AC coordinates as static coordinates.

The gate signal generating section 25 generates gate signals (that is, PWM signals), which are switching commands including pulses for turning ON and OFF the switching elements of the PWM inverter 14A in the PDU 14, by pulse-width modulation based on, for example, the sine-wave output voltages *Vu, *Vv and *Vw for the respective phases, a chopping wave carrier signal, and a switching frequency.

The three-phase/d-q converting section 26 uses the rotation angle θ of the rotor input from the rotation sensor 18 to convert the respective phase currents Iu, Iv, Iw, which are current on the static coordinates, into the d-axis current Ids and the q-axis current Iqs on the rotating coordinates for the rotation phases of the motor 12, that is, the d-q coordinates. In addition, since the motor 12 is a three-phase motor, current flowing in one arbitrary phase is uniquely determined by current flowing in the two remaining phases detected by the phase current sensors 17a and 17b. For example, an equation of V-phase current Iv={-(U-phase current Iu+W-phase current Iw)} is satisfied.

The rotation number calculating section 27 calculates the motor rotation number ω of the motor 12 on the basis of the rotation angle θ of the rotor input from the rotation sensor 18.

The counter electromotive voltage calculating section 28 acquires a counter electromotive voltage constant Ke by, for example, map searching for a predetermined map on the basis of the temperature Tmot of the motor 12 input from the temperature sensor 19, and outputs as counter electromotive voltage ω·Ke a value (ω×Ke) obtained by multiplying the motor rotation number ω input from the rotation number calculating section 27 by the counter electromotive voltage constant Ke.

Figure 3:
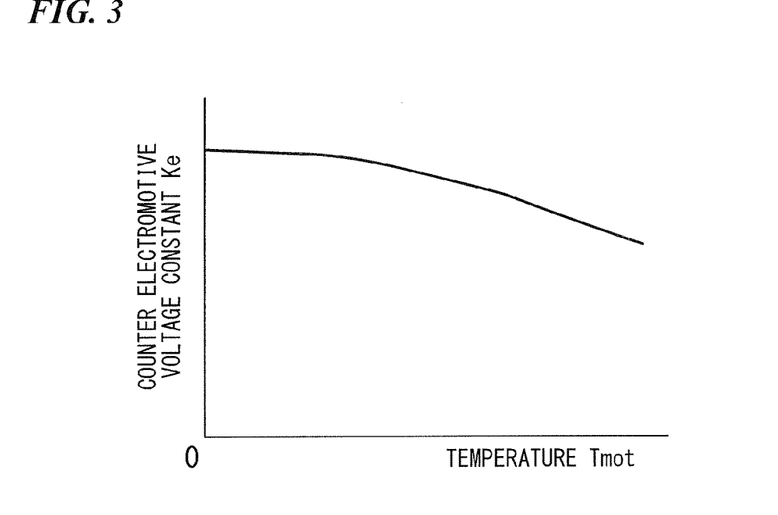
FIG. 3 is a graph illustrating an example of a correlative relation between a temperature of a motor Tmot and a counter electromotive voltage constant Ke according to the embodiment of the invention.

The predetermined map indicating a correlative relation between the counter electromotive voltage constant Ke and the temperature Tmot of the motor 12, as shown in FIG. 3, for example, is set so that the counter electromotive voltage constant Ke decreases with an increase in the temperature Tmot of the motor 12.

Independently of the current feedback control on the d-q coordinates performed by the current control section 22, the boost voltage command calculating section 29 acquires the boost voltage command *Vpdu by the map searching for the predetermined map, so as to say, by feed forward control on the basis of the torque command *Tq input from the torque command calculating section 20 and the counter electromotive voltage ω·Ke input from the counter electromotive voltage calculating section 28.

Figure 4:
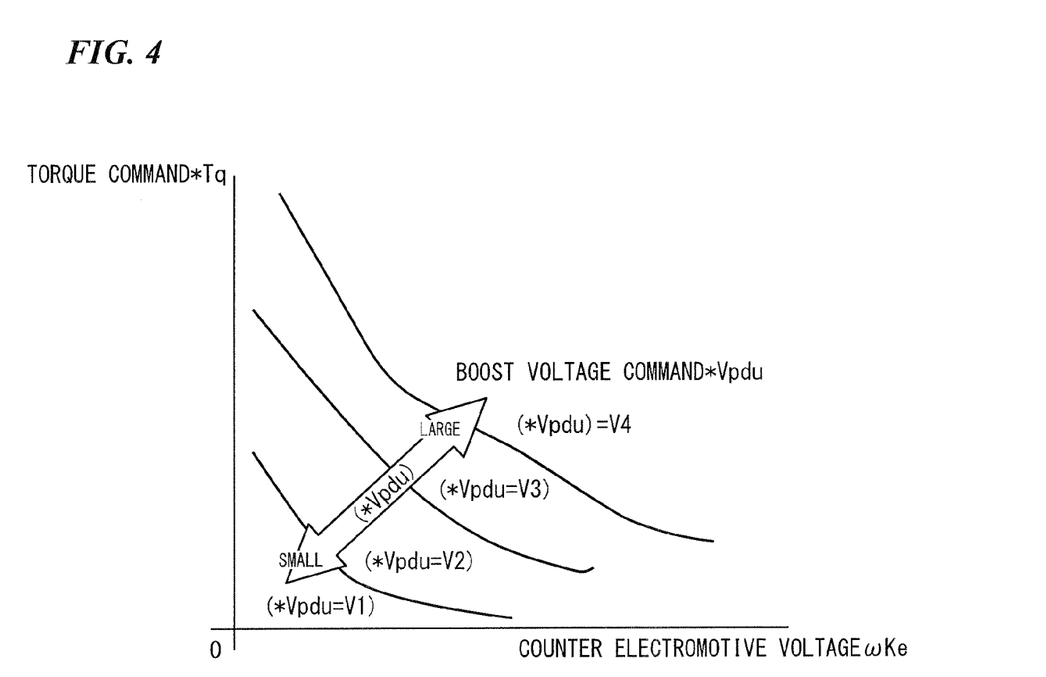
FIG. 4 is a graph illustrating an example of a correlative relation among a counter electromotive voltage ω·Ke, a torque command *Tq, and a boost voltage command *Vpdu according to the embodiment of the invention.

As shown in FIG. 4, for example, the predetermined map is a map which shows areas of a plurality of the boost voltage commands *Vpdu (for example, *Vpdu=V1, V2, V3, and V4 and V1>V2>V3>V4) set on the plane of two-dimensional rectangular coordinates by the torque command *Tq and the counter electromotive voltage ω·Ke. The predetermined map is set so that the boost voltage commands*Vpdu increases with an increase in the toque command *Tq or the counter electromotive voltage ω·Ke.

Figure 5A:
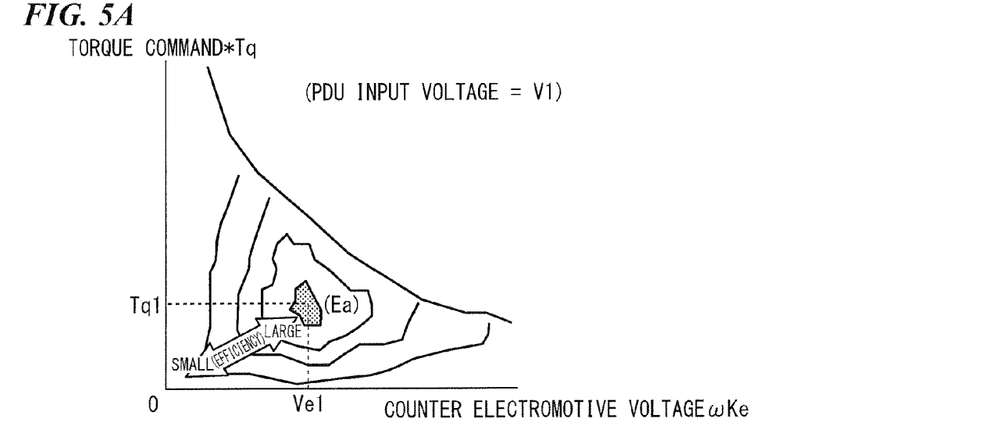
FIGS. 5A to 5C are graphs illustrating examples of the correlative relation among the counter electromotive voltage ω·Ke, the torque command *Tq, PDU input voltage, and efficiency of a motor according to the embodiment of the invention.
Figure 5B:
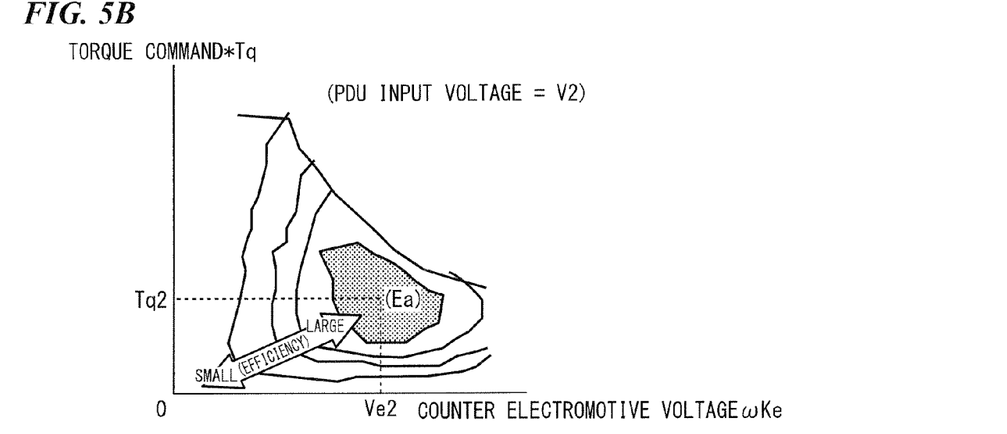
Figure 5C:
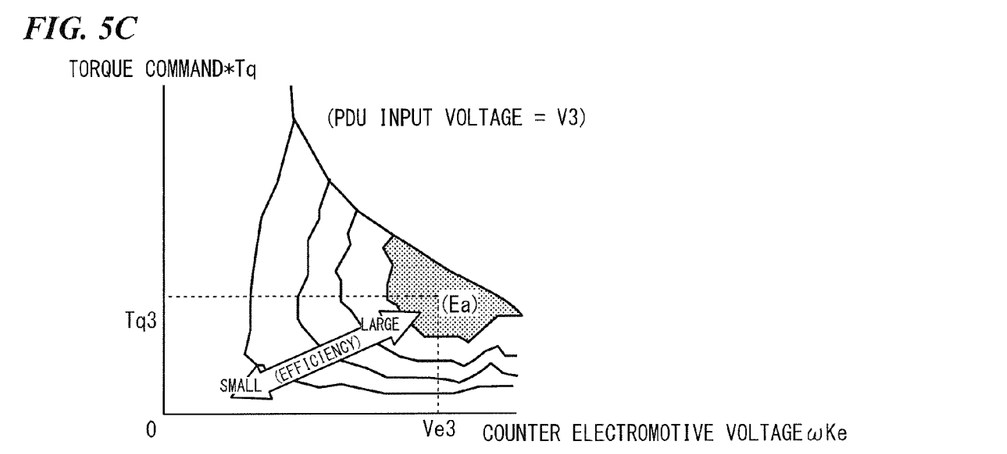

As shown in FIGS. 5A to 5C, for example, the predetermined map is prepared on the basis of maps indicating variation in efficiency (running efficiency) of the motor 12 determined by the toque commands *Tq and the counter electromotive voltages ω·Ke, which are prepared in each of the plurality of PDU input voltage (that is, input voltage for the PWM inverter 14A of the PDU 14, for example, V1, V2, V3, etc.).

In the maps shown in FIGS. 5A to 5C, for example, the efficiency of the motor 12 is the maximum efficiency Ea at each coordinate position of predetermined toque command values Tq1, Tq2, and Tq3 (for example, Tq1<Tq2<Tq3) and predetermined counter electromotive voltages Ve1, Ve2, and Ve3 (for example, Ve1<Ve2<Ve3) on the planes of the two-dimensional rectangular coordinates by the toque command *Tq and the counter electromotive voltage ω·Ke. The predetermined map shown in FIG. 4, where the PDU input voltages are the boost voltage commands *Vpdu, is prepared from combination of the PDU input voltages and the toque commands *Tq and the counter electromotive voltages ω·Ke corresponding to the maximum efficiencies Ea.

According to the embodiment, the control device of the boost converter has the above-described configuration. Next, operations (that is, a control method of the boost converter) of the control device of the boost converter are explained.

A current supply control process and a boost control process described below are performed at independent timing.

First, the current supply control process is explained.

Figure 6:
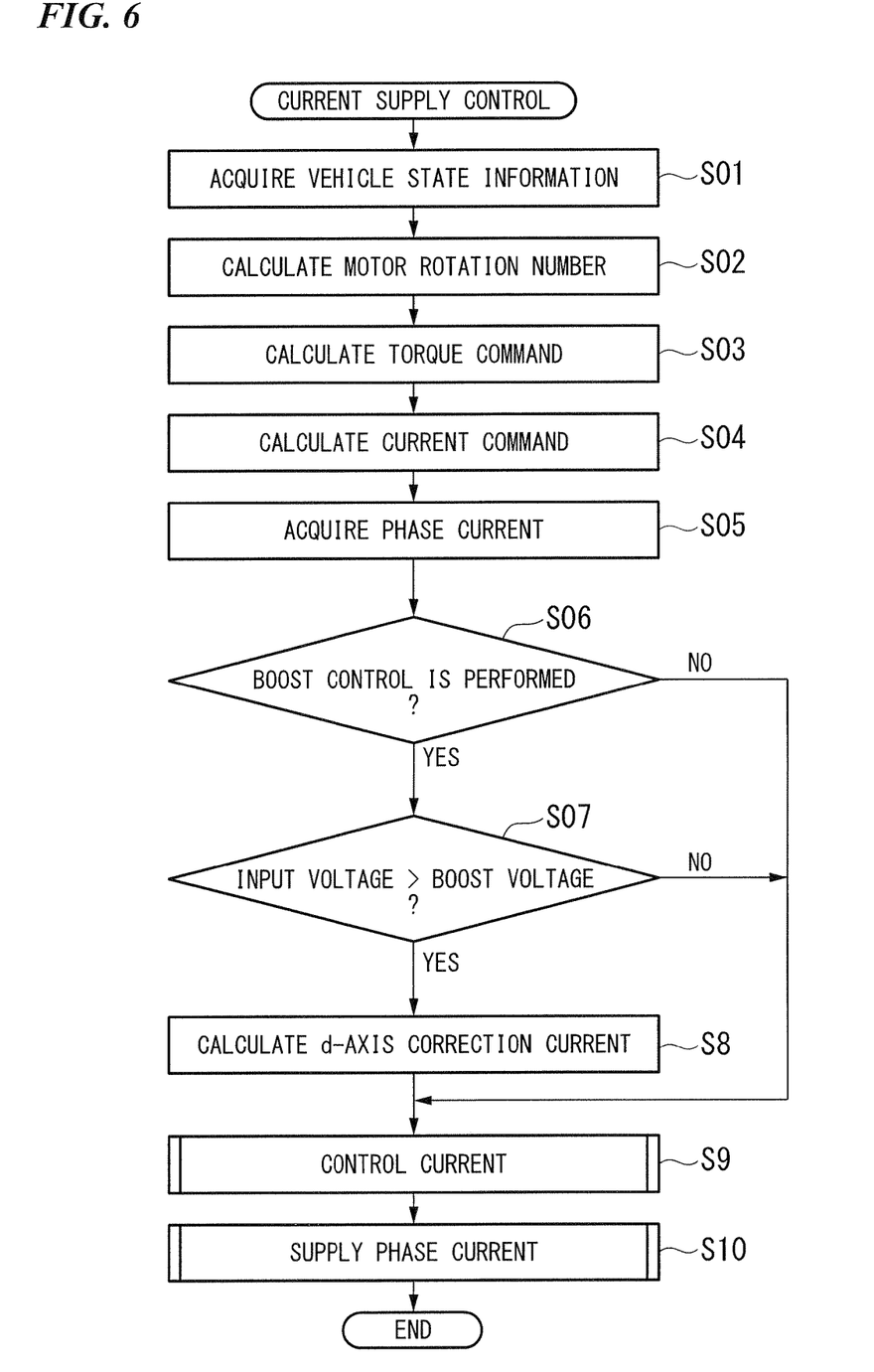
FIG. 6 is a flowchart illustrating a current supply control process according to the embodiment of the invention.

In Step S01 shown in FIG. 6, for example, the vehicle state information which is constituted by the accelerator opening degree by the acceleration operation of a driver, the brake pedal force by the brake operation of a driver, and the shift position by a transmission operation of a driver.

Subsequently, in Step S02, the motor rotation number ω of the motor 12 is calculated on the basis of the rotation angle θ of the rotor input from the rotation sensor 18.

Subsequently, in Step S03, the torque command *Tq is calculated on the basis of the vehicle state information and the motor rotation number ω.

Subsequently, in Step S04, the Id command *Id and the Iq command *Iq are calculated in accordance with the toque command *Tq.

Subsequently, in Step S05, the respective phase currents Iu, Iv, and Iw are acquired on the basis of the detection values of the phase current sensors 17a and 17b.

Subsequently, in Step S06, it is determined whether to perform the boost control process.

If the determination result is "NO", then the process proceeds to Step S09 described below.

Alternatively, if the determination result is "YES", then the process proceeds to Step S10.

Subsequently, in Step S07, it is determined whether or not the input voltage of the PWM inverter 14A varying with the counter electromotive voltage of the motor 12 is higher than the boost voltage detected by the voltage sensor 14e.

If the determination result is "NO", then the process proceeds to Step S09 described below.

Alternatively, if the determination result is "YES", then the process proceeds to Step S08.

Subsequently, in Step S08, the d-axis correction current, which is the target value for the weak field current, is calculated.

Subsequently, in Step S09, the respective phase currents Iu, Iv and Iw are converted into the d-axis current Ids and the q-axis current Iqs, and the deviation ΔId between the additional value (*Id+d-axis correction current) of the Id command *Id and the d-axis correction current and the d-axis current Ids, and the deviation ΔIq between the Iq command *Iq and the q-axis current Iqs are calculated. By the PI (Proportional Integral) operation, for example, the d-axis voltage command value *Vd is calculated by amplifying the deviation ΔId and the q-axis voltage command value *Vq is calculated by amplifying the deviation ΔIq.

Subsequently, in Step S10, the AC U-shape current Iu, V-phase current Iv, and W-phase current Iw are supplied to the stator windings of the respective phases of the three-phase motor 12 by the PWM, which is the sine-wave modulation, on the basis of the d-axis voltage command value *Vd and the q-axis voltage command value *Vq, and then the series of processing ends.

Hereinafter, the boost control process is explained.

Figure 7:
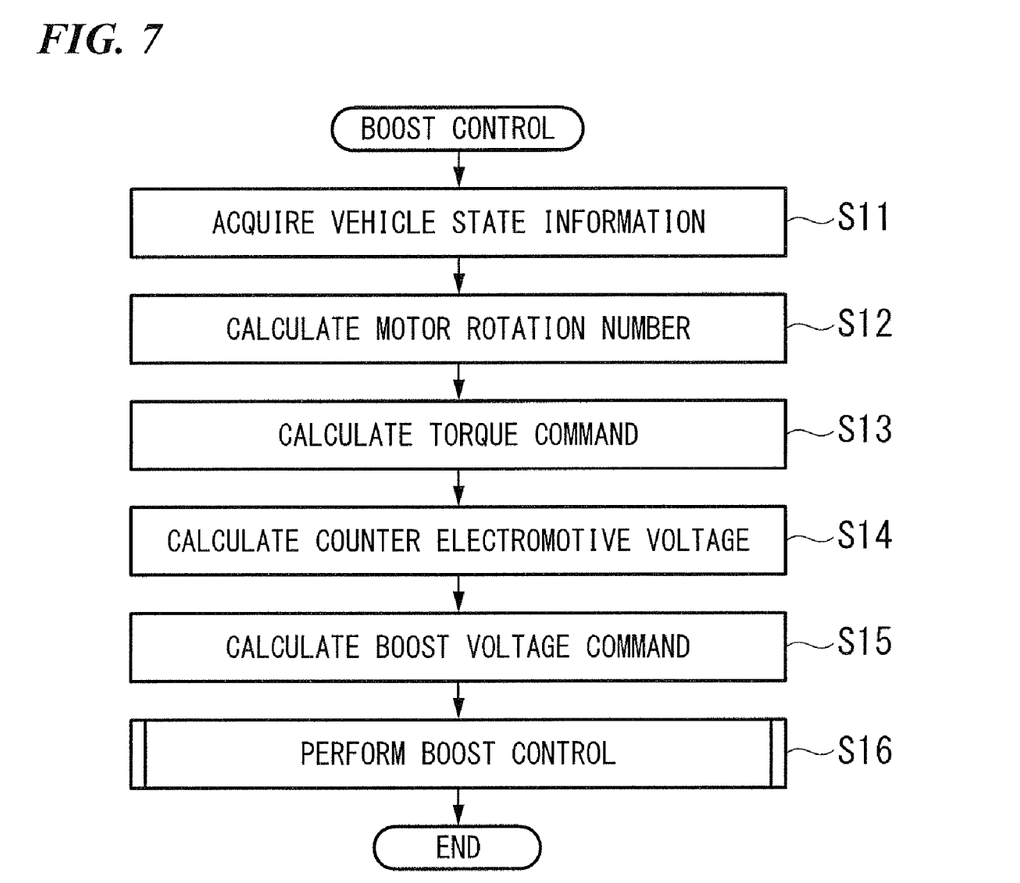
FIG. 7 is a flowchart illustrating a boost control process according to the embodiment of the invention.

In Step S11 shown in FIG. 7, for example, the vehicle state information which is constituted by the opening degree by the acceleration operation of a driver, the brake pedal force by the brake operation of a driver, and the shift position by a transmission operation of a driver.

Subsequently, in Step S12, the motor rotation number ω of the motor 12 is calculated on the basis of the rotation angle θ of the rotor input from the rotation sensor 18.

Subsequently, in Step S13, the torque command *Tq is calculated on the basis of the vehicle state information and the motor rotation number ω.

Subsequently, in Step S14, the counter electromotive voltage constant Ke is acquired the map searching of the predetermined map based on the temperature Tmot of the motor 12 and the value (ω×Ke) obtained by multiplying the motor rotation number ω by the counter electromotive voltage constant Ke is output as the counter electromotive voltage ω·Ke.

Subsequently, in Step S15, the boost voltage command *Vpdu is calculated by the map searching for the predetermined map based on the toque command *Tq and the counter electromotive voltage ω·Ke.

Subsequently, in Step S16, the ON and OFF states of the transistors S1 and S2 of the boost circuit 16A are newly changed at the duty ratio in response to the boost voltage command *Vpdu and the boost voltage in response to the boost voltage command *Vpdu is generated between the positive terminal pt and the negative terminal nt, and then the series of processing ends.

According to the control device of the boost converter and the control method of the boost converter, as described above, it is possible to perform the boost control process at independent timing with the current supply control process on the brushless DC motor 12 in that the boost voltage command *Vpdu is set on the basis of the counter electromotive voltage ω·Ke of the brushless DC motor 12 and the toque command *Tq for the brushless DC motor 12. Accordingly, processing load generated when these processes are performed can be reduced and these processes can be performed at a high speed by performing these processes at independent timing one another. Moreover, the appropriate boost voltage command

*Vpdu can be set even when the counter electromotive voltage ω·Ke varies with variation in driving states of the brushless DC motor 12.

It is possible to set the boost voltage command *Vpdu by setting the value obtained by multiplying the motor rotation number ω of the brushless DC motor 12 by the counter electromotive voltage constant Ke as the counter electromotive voltage ω·Ke, that is, the feed forward control. For example, it is possible to perform the boost control process at independent timing with the current supply control process including the current feedback control, and the reduction in the processing load and the high-speed process can be realized since.

It is possible to set the appropriate boost voltage command *Vpdu in that the counter electromotive voltage constant Ke is set so as to decrease with the increase in the temperature Tmot of the brushless DC motor 12, even when the counter electromotive voltage decreases with the increase in the temperature of the brushless DC motor 12.

It is possible to expand a running area from the running area attainable by the boost control process to a high-speed rotation side by supplying the weak field current, when the input voltage of the PWM inverter 14A becomes higher than the boost voltage during the boost control process.

In the above-described embodiment, the counter electromotive voltage calculating section 28 calculates the counter electromotive voltage ω·Ke from the counter electromotive voltage constant Ke and the motor rotation number ω on the basis of the temperature Tmot of the motor 12, but the present invention is not limited thereto. For example, as long as the motor 12 is a variable motor capable of changing the counter electromotive voltage constant Ke by changing the magnitude of a magnetic field, a boost voltage command calculating section 29 may calculate as the counter electromotive voltage a value (ω×Kec) obtained by multiplying the motor rotation number ω input from the rotation number calculating section 27 by a counter electromotive voltage constant command Kec, which is a command for the counter electromotive voltage constant Ke.

Figure 8:
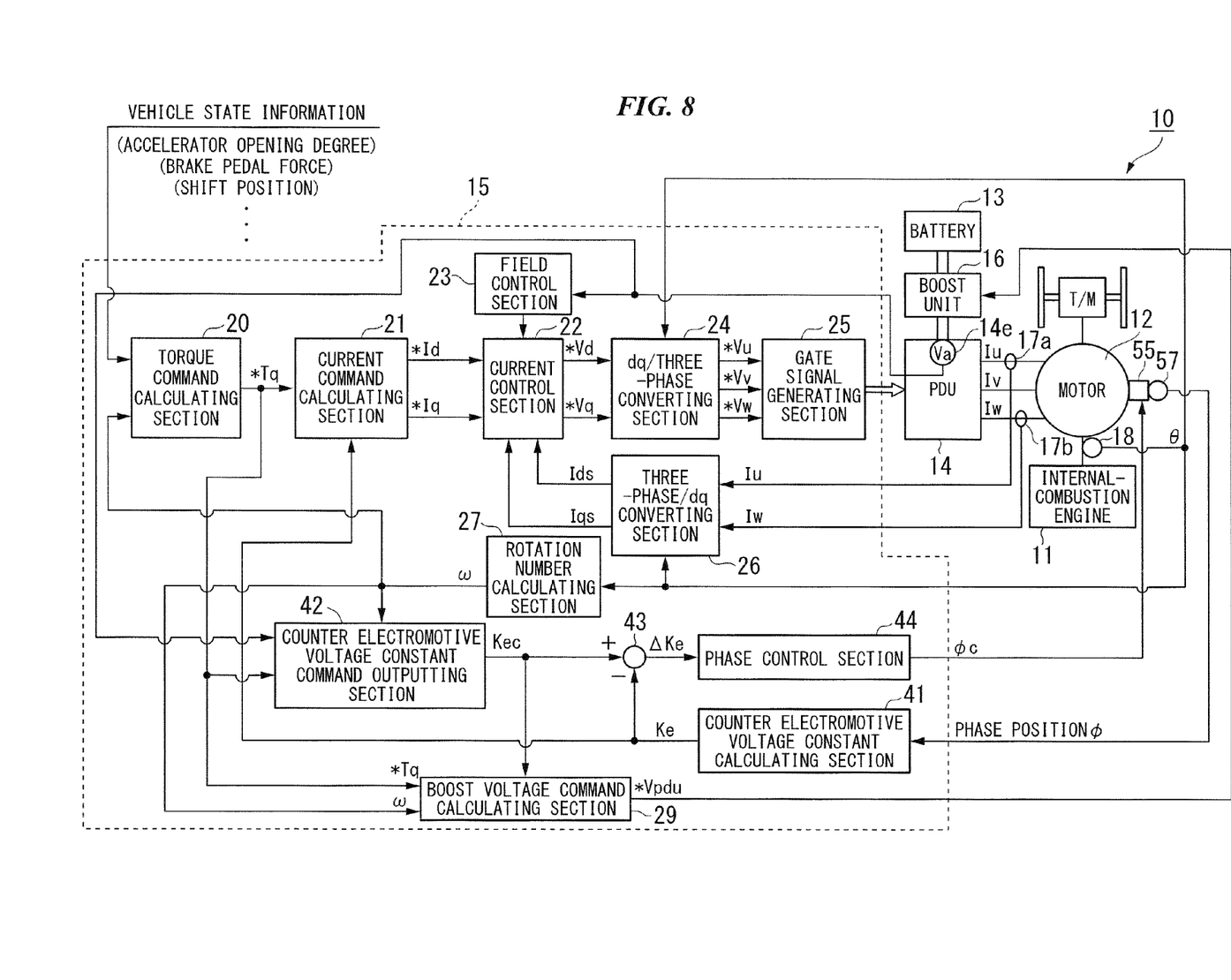
FIG. 8 is a schematic diagram illustrating a configuration of a control device of a boost converter according to a modified example of the embodiment of the invention.

According to a modified example of the above-described embodiment shown in FIG. 8, for example, a control unit 15 of a motor control device 10 includes a toque command calculating section 20, a current command calculating section 21, a current control section 22, a field control section 23, a d-q/three-phase converting section 24, a gate signal generating section 25, and a three-phase/d-q converting section 26, a rotation number calculating section 27, a boost voltage command calculating section 29, a counter electromotive voltage constant calculating section 41, a counter electromotive voltage constant command outputting section 42, a counter electromotive voltage constant difference calculating section 43, and a phase control section 44.

Figure 9:
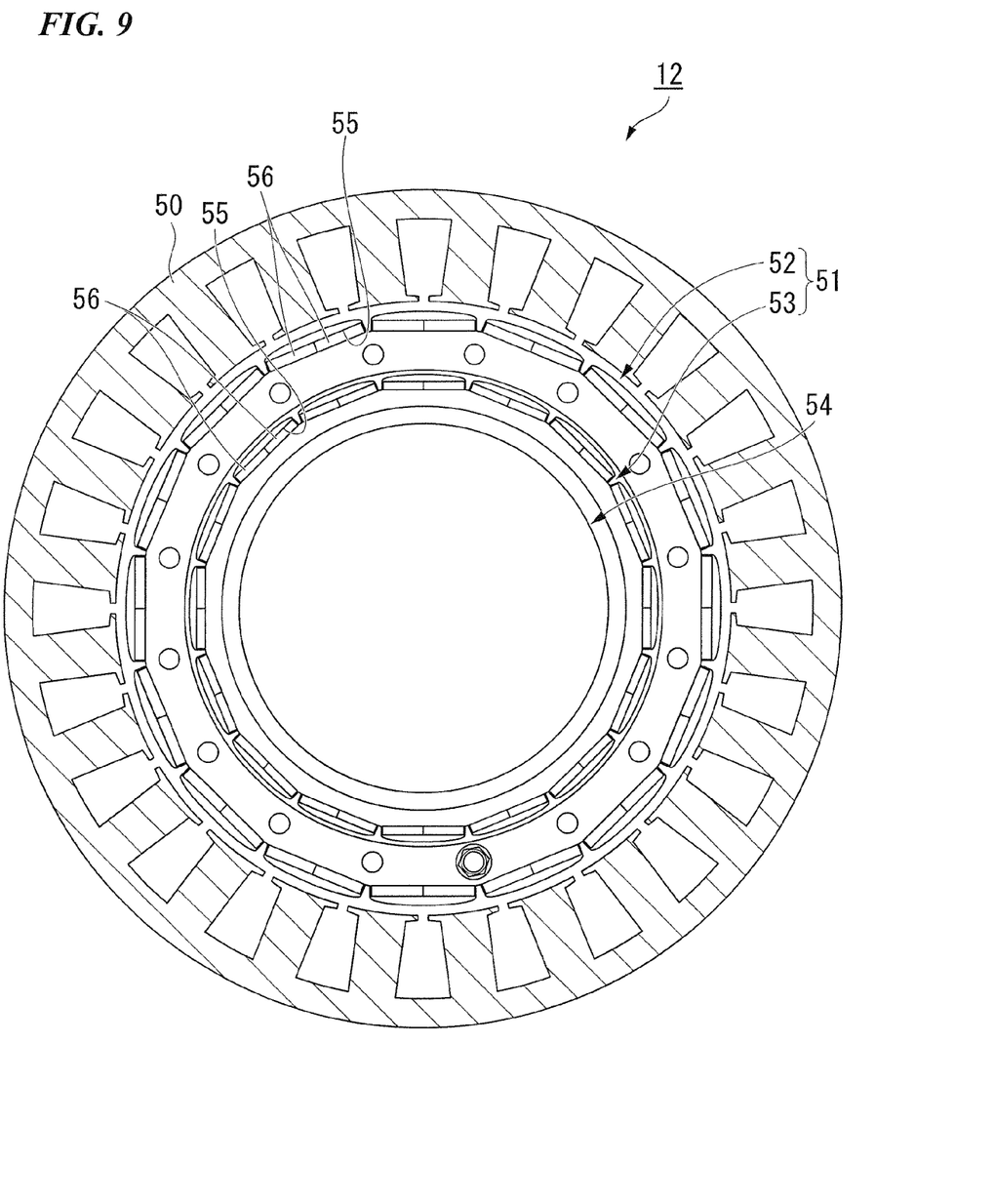
FIG. 9 is a schematic sectional view illustrating the motor according to the modified example of the embodiment of the invention.

As shown in FIG. 9, for example, the motor 12 according to the modified example is an inner rotor type brushless motor which a rotor unit 51 is disposed in the inner circumference of a circular stator 50. The motor 12 includes: the rotor unit 51 provided with an outer circumferential rotor 52 and inner circumferential rotor 53 which are relatively rotatable one another within a range of a predetermined set angle; and a phase changing unit controlling a relative phase of the outer circumferential rotor 52 with respect to the inner circumferential rotor 53 by a rotational movement mechanism 54 such as a vane type hydraulic actuator or a planetary gear mechanism.

In the outer circumferential rotor 52 and the inner circumferential rotor 53, a plurality of magnetic-mounting slots 55, 55 are provided at positions deviated from the outer circumference of the circular rotor iron core, which is a main body of the rotors and flat plate-shaped permanent magnets 56 magnetized in a thickness direction (that is, a diameter direction) are mounted. The permanent magnets 56 which are mounted in each of the magnet-mounting slots 55 and adjacent to each other in a circumferential direction are mounted so that magnetization directions thereof are opposite to each other.

The rotor unit 51 becomes a weak field state where a magnetic field of the rotor unit 51 is weak on the whole in heteropolar arrangement in which the faced pole of the permanent magnets 56 of the outer circumferential rotor 52 and the faced pole of the permanent magnets 56 of the inner circumferential rotor 53 are the same as each other, for example, by changing the relative phase of the outer circumferential rotor 52 and the inner circumferential rotor 53 by the rotational movement mechanism 54 in accordance with a control command φc input from the control unit 15. In addition, for example, the rotor unit 51 becomes a strong magnetic field state where the magnetic field of the rotor unit 51 is strong on the whole in homopolar arrangement in which the faced pole of the permanent magnets 56 of the outer circumferential rotor 52 and the faced pole of the permanent magnets 56 of the inner circumferential rotor 53 are different from each other in the same manner.

In the control unit 15 according to the modified example, the counter electromotive voltage constant calculating section 41 calculates the counter electromotive voltage constant Ke corresponding to the relative phase of the outer circumferential rotor 52 with respect to the inner circumferential rotor 53 on the basis of a phase position φ related to the relative phase of the outer circumferential rotor 52 with respect to the inner circumferential rotor 53 output from a phase position sensor 57.

The counter electromotive voltage constant command outputting section 42 outputs the command value (counter electromotive voltage constant command) Kec for the counter electromotive voltage constant Ke of the motor 12 on the basis of the toque command *Tq, the motor rotation number ω, and the boost voltage Va output from the voltage sensor 14e.

The counter electromotive voltage constant difference calculating section 43 outputs a counter electromotive voltage constant difference ΔKe obtained by subtracting the counter electromotive voltage constant Ke output from the counter electromotive voltage constant calculating section 41 from the counter electromotive voltage constant command value Kec output from the counter electromotive voltage constant command outputting section 42.

The phase control section 44 outputs the control command φc used to control the relative phase on the basis of the counter electromotive voltage constant difference ΔKe output from a counter electromotive voltage constant difference calculating section 43 so that the counter electromotive voltage constant difference ΔKe becomes zero.

According to the modified example, it is possible to appropriately set the boost voltage command *Vpdu even when the counter electromotive voltage of the motor 12 varies in accordance with the counter electromotive voltage constant command value Kec.

In the above-described embodiment, the current control section 22 of the control unit 15 performs the current feedback control on the d-q coordinates forming the rotating rectangular coordinates, but the present invention is not limited thereto. For example, the voltage commands of the d-axis voltage command value *Vd and the q-axis voltage command value *Vq may be calculated by calculation processing based on a predetermined voltage equation of the Id command *Id and the Iq command *Iq input from the current command calculating section 21.

The invention is not limited to the above-described embodiment, for example, but may be applied to electric vehicles other than hybrid vehicles. Moreover, the present invention is not limited to vehicles, but may be applied to motors mounted to an appropriate device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control device of a boost converter which includes:
   an inverter circuit which controls switching to apply current to a stator winding of respective phases of a multi-phase brushless DC motor; and
   a boost circuit which is provided on an input side of the inverter circuit and has at least a reactor and a switching element, and controls ON and OFF states of the switching element of the boost circuit on the basis of a boost voltage command which is a command for boost voltage output from the boost circuit, the control device comprises
   a boost voltage command setting unit which sets the boost voltage command on the basis of counter electromotive voltage of the brushless DC motor and a torque command for the brushless DC motor.

2. The control device of the boost converter according to claim 1, further comprising:
   an angular speed detecting unit which detects an angular speed of the brushless DC motor; and
   a counter electromotive voltage calculating unit which sets, as the counter electromotive voltage, a value obtained by multiplying the angular speed detected by the angular speed detecting unit by a counter electromotive voltage constant of the brushless DC motor.

3. The control device of the boost converter according to claim 2, further comprising
   a temperature detecting unit which detects a temperature of the brushless DC motor, wherein
   the counter electromotive voltage calculating unit sets the counter electromotive voltage constant so as to decrease with an increase in the temperature detected by the temperature detecting unit.

4. The control device of the boost converter according to claim 1, wherein
   the brushless DC motor includes:
   a plurality of rotors capable of changing the relative phases one another; and
   a phase changing unit capable of changing the counter electromotive voltage with the change in the relative phases, wherein
   the control device of the boost converter further includes
   an angular speed detecting unit which detects an angular speed of the brushless DC motor;
   a counter electromotive voltage constant command calculating unit which calculates a counter electromotive voltage constant command, which is a command for the counter electromotive voltage constant, on the basis of the torque command for the brushless DC motor and the angular speed detected by the angular speed detecting unit; and
   a phase control unit which calculates a phase command instructing the phase changing unit to change the relative phases on the basis of the counter electromotive voltage constant command, and wherein
   the boost voltage command setting unit sets, as the counter electromotive voltage, a value obtained by multiplying the angular speed detected by the angular speed detecting unit by the counter electromotive voltage constant command, and sets the boost voltage command on the basis of the counter electromotive voltage and the toque command.

5. The control device of the boost converter according to claim 1, further comprising
   a field control unit which supplies weak field current when input voltage of the inverter circuit exceeds the boost voltage during a boost control process on the basis of the boost voltage command.

6. A control method of a boost converter which includes:
   an inverter circuit which controls switching to apply current to a stator winding of respective phases of a multi-phase brushless DC motor; and
   a boost circuit which is provided on an input side of the inverter circuit and has at least a reactor and a switching element, and controls ON and OFF states of the switching element of the boost circuit on the basis of a boost voltage command which is a command for boost voltage output from the boost circuit, the control method comprising:
   setting the boost voltage command on the basis of counter electromotive voltage of the brushless DC motor and a torque command for the brushless DC motor.

7. The control method of a boost converter according to claim 6, further comprising
   supplying weak field current when voltage input by the inverter circuit exceeds the boost voltage during the boost control process on the basis of the boost voltage command.

* * * * *